Patented June 13, 1950

2,511,288

UNITED STATES PATENT OFFICE 2,511,288

PREPARATION OF A PROTECTIVE ADSORBENT CARBON

Jacque C. Morrell and George T. Tobiasson, Chicago, Ill., assignors, by mesne assignments, to the United States of America as represented by the Secretary of War No Drawing. Application May 1, 1942,
Serial No. 441,270

2 Claims. (Cl. 252—447)

The invention described herein may be manufactured and used by or for the Government for governmental purposes, without the payment to us of any royalty thereon.

This invention relates to the improvement of adsorbent materials such as activated carbons for use as gas absorbents in gas masks and shelters. It relates more particularly to a process for depositing active catalysts upon adsorbent surfaces such as those of activated carbons to improve by chemical and catalytic means, as well as by adsorptive means, the absorptive abilities of these materials to remove poisonous gases from gaseous mixtures.

By the absorptive properties of the chars we mean all properties of the impregnated and calcined chars which enable them to remove poisonous gases and vapors from gas mixtures and particularly from air containing poisonous gases such as those of the type of arsine, hydrogen cyanide, cyanogen chloride, etc. Some of these gases may be retained by the char because of adsorption on its surface, while other gases are oxidized and thus rendered less harmful or harmless. In case of readily oxidizable gases as arsine, the impregnated and calcined char acts as an oxidizing agent or catalyst; in the latter case the oxygen of the air is utilized for oxidizing the poisonous gas.

Activated carbons which may be treated to improve their activity for removing poisonous gases and vapors from air are obtainable from several sources. Some of these activated carbons are referred to briefly as follows: Coconut charcoal is produced from coconut shells which are dried, then carbonized and activated at a temperature of from about 1600 to about 1700° F. in the presence of steam or of a mixture of steam and flue gas which may contain small amounts of air and in some activation treatments, air is used as such. Fruit pits are also convertible into activated chars by using similar methods. Other activated carbons, generally referred to as domestic or synthetic chars, may be manufactured from coal, coke, wood, or wood charcoal or various mixtures of the same employing in some cases specific types of coal with or without the addition of wood char. Such carbonaceous materials are generally dried, ground to fine powder, mixed with a binder as pitch, and briquetted; after which the briquettes are crushed to give granular material of about 6 to 20 mesh particle size which is then carbonized and activated. The components may also be treated with various chemical reagents before mixing. Similarly, wood may be treated with reagents such as zinc chloride and subsequently carbonized and activated.

In the prior art, a number of metal compounds have been deposited on activated carbons to increase the absorptiveness of the carbons for poisonous gases. Of these metal compounds copper oxide is a particularly important example. One method for depositing active copper oxide on an absorbent comprises the preparation of a solution of a copper ammonium carbonate complex, impregnating the absorbent with this solution, and subsequently heating to dry the char and to convert deposited salts to active copper oxide, especially to the cupric oxide. Thus, in an established practice, ammonia, carbon dioxide, and air may be bubbled through a column of water and scrap copper for a more or less prolonged period of time until a solution is formed which may contain approximately 7 to 9 per cent by weight of copper, 10 to 12 per cent of ammonia, and 5 to 6 per cent of carbon dioxide by analysis. The absorbent or char is wetted with this solution, or soaked in it and is subsequently drained to remove excess solution. The impregnated char is then heated to dry the char and to remove carbon dioxide and ammonia resulting from the decomposition of copper ammonium carbonate complex deposited upon the carbon. It has been found more recently that the absorptive properties of the char may be improved by increasing the ammonia and carbon dioxide content of the impregnating solution, either by fortifying the solution as above prepared, or by preparing the aqueous solution synthetically from salts such as basic copper carbonate and ammonium carbonate, and added ammonia.

The absorptive abilities of impregnated chars prepared as stated above have been further improved in the prior art by secondary impregnation. Thus a char, with or without previous impregnation with copper oxide, has been dried and/or calcined and subsequently sprayed with a solution of silver nitrate, with and without further drying treatment, to obtain a char having high absorption properties particularly for arsine when the treated chars are used in a highly humidified condition. Although the absorptive capacity of impregnated chars for poisonous gases has been increased further by the secondary treatment, certain disadvantages have resulted. It has been found in some cases, for example, that after secondary impregnation or treatment, some chars have a lower absorption than previously for acid gases such as hydrocyanic acid. It is among the objects of the present invention to gain the advantages obtained heretofore by a secondary impregnation of chars, but at the same time to minimize or substantially eliminate the previously observed deleterious effects of the secondary impregnation. A further important object is to simplify the impregnation procedure by reducing the number of operations necessary to produce chars of high activities. Further objects of the invention will be apparent from the following description of the process.

In one specific embodiment the present invention comprises a process for preparing absorbents of high activity for removing poisonous gases from air, which comprises forming a composite solution by adding to a solution of copper ammonium carbonate complex a silver compound soluble therein, impregnating an active carbon with said composite solution, and heating the impregnated material to remove water and volatile products and to form an impregnated carbon of improved absorptive capacity for poisonous gases.

According to the simplified process of the present invention, which we herein refer to as an integrated process, improved gas absorbent chars are produced by means of a single impregnating step and a heating or calcining operation. The improved chars so obtained have different characteristics from the chars produced by methods of the prior art.

In carrying out the process of our invention, a solution of copper ammonium carbonate complex, preferably with a relatively high ammonia content, is prepared and a soluble silver compound is incorporated therein. Thus, silver nitrate, may for example be dissolved in water to form a rather concentrated solution such as a 10 to 50 per cent solution and the aqueous silver nitrate solution may be added gradually with stirring to the copper-containing solution. For the addition of a soluble silver compound to the copper ammonium carbonate solution, a strong silver nitrate solution is employed merely to avoid substantial dilution of the impregnating solution. It has been found that if any precipitation occurs during the addition of the silver nitrate solution, the precipitate is readily redissolved while the agitation or stirring is continued. The amount of silver compound added to the copper-containing solution may vary upwards to 1.0 per cent by weight or more of silver, but large variations in the amounts of added silver may not materially affect the results. Good results have been obtained in many preparations in which from approximately 0.003 to 1.0 per cent by weight of silver is on the char.

According to the process of our invention the adsorbent or charcoal to be impregnated is wetted with the impregnating solution in any desired manner. Thus, for example, a char is soaked in the solution and the excess solution is removed from the impregnated material by draining. During such soaking or impregnation treatment the solution has usually been at a temperature between about 60° and about 140° F. although lower and higher temperatures may also be utilized. The wet impregnated char is then directed to a drying and calcining or conversion treatment to remove moisture, to decompose the complex copper and silver salts or other compounds, and to remove the gaseous decomposition products which are mainly ammonia and carbon dioxide. Thus, the wet impregnated char may be introduced to a rotary dryer and gradually raised to a temperature of about 300° F. so as to effect the desired drying and conversion treatment. The maximum temperature used during the drying and calcining varies somewhat with the type of char, the composition of the impregnating solution employed, and other factors, so that, in some instances, temperatures as high as 400 to 500° F. may be used for a short period of time without substantial detrimental effects on the impregnated char. More frequently however, the temperature employed may be from about 275° to about 350° F., and care should be observed so that the char does not ignite in the presence of air at high temperatures as a result of the active metal catalysts deposited thereon. After cooling, the impregnated chars are packed in air-tight containers to exclude moisture and other absorbable materials.

It is apparent from the above description of the process that a considerable simplification of the equipment and a marked saving in labor are effected by this process since only a single impregnation treatment and a drying and calcining operation are necessary instead of a series of two impregnation steps and two drying and calcining steps, which heretofore have been employed. Besides the above indicated advantages of the process, the impregnated and calcined char is a more effective gas absorbent than the char obtained from the two-stage process of the prior art. Furthermore, a better distribution of the silver upon the char is obtained in our process than is obtained by the methods used heretofore.

Chars impregnated, dried, and calcined according to the process of the present invention also have long active life and a relatively low tendency to absorb moisture, become sticky, and lose their activity to absorb poisonous gases. Impregnated chars of the types herein described are particularly effective in absorbing poisonous gases and vapors under conditions of relatively high humidity The following example is given to illustrate the integrated process of impregnating activated carbons with both copper and silver, and some of the results obtained in employing these materials for removing poisonous gases from air, although the data given are not intended to limit the broad scope of the invention:

An impregnating solution was prepared by bubbling ammonia, carbon dioxide, and air through a reactor containing water and copper wire to obtain an intermediate solution of copper ammonium carbonate complex, found by analysis to contain 7.7 per cent by weight of copper, 8.0 per cent ammonia, and 4.6 per cent carbon dioxide. This intermediate solution was then fortified with aqueous ammonia, hydrated copper carbonate, and ammonium carbonate to produce a solution which upon analysis was found to contain approximately 10 per cent by weight of copper, 16 per cent ammonia, and 11 per cent carbon dioxide. In several runs different amounts of silver nitrate were added to the fortified copper ammonium carbonate solution by gradually stirring a 50 per cent aqueous solution of silver nitrate into the copper-containing solution. Thus, several batches of copper ammonium carbonate solution were prepared containing silver nitrate in the proportions of approximately 6, 19, 61 and 222 pounds of silver nitrate per 1000 gallons of solution. Activated coconut charcoal of 6 to 20 mesh particle size suitable for use in gas masks was impregnated with these solutions and with the copper ammonium carbonate solution containing no added silver nitrate, and the excess solution was then drained from each of the impregnated materials. Each of the impregnated chars was dried for from about 1.5 to 2.0 hours, and the temperature was then gradually increased to approximately 300° F. to calcine these materials.

In order to evaluate the chars impregnated by our integrated process and to show their marked superiority over copper-impregnated chars prepared without the additional use of silver, these chars were equilibrated to constant weight with air of 75 to 80 per cent relative humidity prior to testing, this pre-treatment with air of high humidity thus simulating their use under tropical conditions. During the humidification treatment these chars absorbed between about 28 and about 30 per cent by weight of moisture. Each of the humidified chars prepared by impregnation with an integrated solution containing both copper and silver, when tested by the official C. W. S. tube test procedure against an arsine-air mixture, showed an arsine life of 52 to 66 minutes. The same kind of char impregnated in exactly the same manner with the copper ammonium carbonate solution but containing no added silver nitrate had an arsine life of only one minute.

The character of the invention and the type of results obtained by its use are evident from the preceding specification and example, although they are not to be construed as to impose undue limitations upon the generally broad scope of the invention.

We claim as our invention:

1. A process for improving the absorptive ability of activated carbon for poisonous gases which consists essentially in impregnating said activated carbon in a single step with an aqueous solution of copper ammonium carbonate fortified with a silver solution of silver nitrate soluble therein, and drying and calcining the impregnated material at a temperature below about 500° F., said impregnated carbon being characterized by having a longer arsine life than activated carbon impregnated with silver free aqueous solution of copper ammonium carbonate.

2. A process for improving the absorptive capacity of activated carbon for poisonous gases which consists essentially in impregnating said activated carbon in a single step with an aqueous solution of copper ammonium carbonate fortified with a silver solution of silver nitrate soluble therein, and drying and heating the impregnated material at a temperature between about 275° and about 350° F. to remove water and to convert the impregnated salts into active catalyst, said impregnated carbon being characterized by having a longer arsine life than activated carbon impregnated with silver free aqueous solution of copper ammonium carbonate.

JACQUE C. MORRELL.
GEORGE T. TOBIASSON.

REFERENCES CITED

The following references are of record in the file of this patent:

UNITED STATES PATENTS

| Number | Name | Date |
|---|---|---|
| 1,519,470 | Wilson | Dec. 16, 1924 |
| 1,540,447 | Wilson | June 2, 1925 |
| 1,995,274 | Eversole | Mar. 19, 1935 |
| 2,212,593 | Dittrich | Aug. 27, 1940 |